United States Patent [19]
Martin

[11] Patent Number: 5,509,717
[45] Date of Patent: Apr. 23, 1996

[54] ALL-TERRAIN VEHICLE ENCLOSURE

[76] Inventor: Robert L. Martin, 3831 Little Zion Rd., Sneads, Fla. 32460

[21] Appl. No.: 276,823

[22] Filed: Jul. 18, 1994

[51] Int. Cl.$^6$ ........................................................ B60J 7/10
[52] U.S. Cl. ........................ 296/77.1; 296/35.3; 296/102; 280/756
[58] Field of Search ................................ 296/77.1, 78.1, 296/79, 80, 102, 103, 104, 901, 190, 35.3; 280/288.2, 304.3, 727, 756, 762

[56] References Cited

U.S. PATENT DOCUMENTS

| | | | |
|---|---|---|---|
| 4,336,964 | 6/1982 | Pivar | 296/77.1 |
| 4,372,602 | 2/1983 | Tsuchiya et al. | 296/77.1 |
| 5,174,622 | 12/1992 | Gutta | 296/77.1 |

Primary Examiner—Andrew C. Pike

[57] ABSTRACT

An all-terrain vehicle enclosure for simultaneously shielding a driver and a driver's all-terrain vehicle from adverse weather conditions and terrain hazards comprises a rigid frame having an open central portion for holding a driver and an all-terrain vehicle therein and a peripheral skeletal portion therearound; a rigid skin secured over the skeletal portion of the frame to define a body, the body further having at least one door aperture and at least one window aperture disposed thereon with the door aperture allowing a driver access therein; and a frame coupling mechanism for removably coupling the body over an all-terrain vehicle such that the wheels of the all-terrain vehicle extend from the body and a driver is allowed to mount the all-terrain vehicle contained therein through the door aperture.

1 Claim, 4 Drawing Sheets

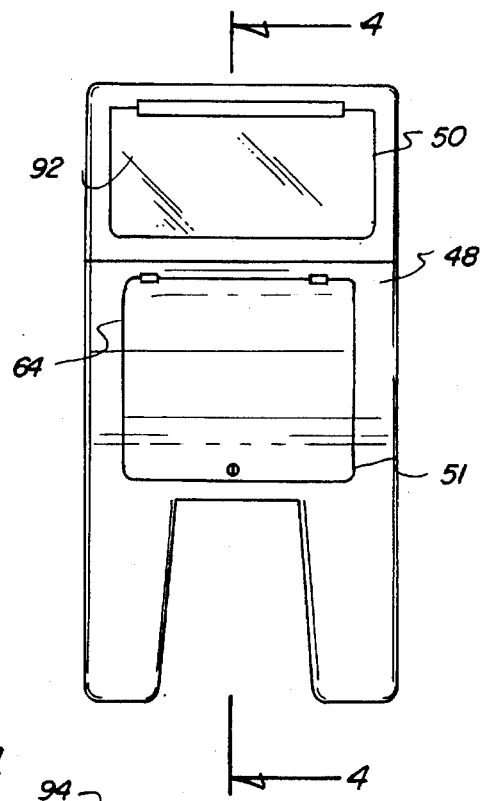
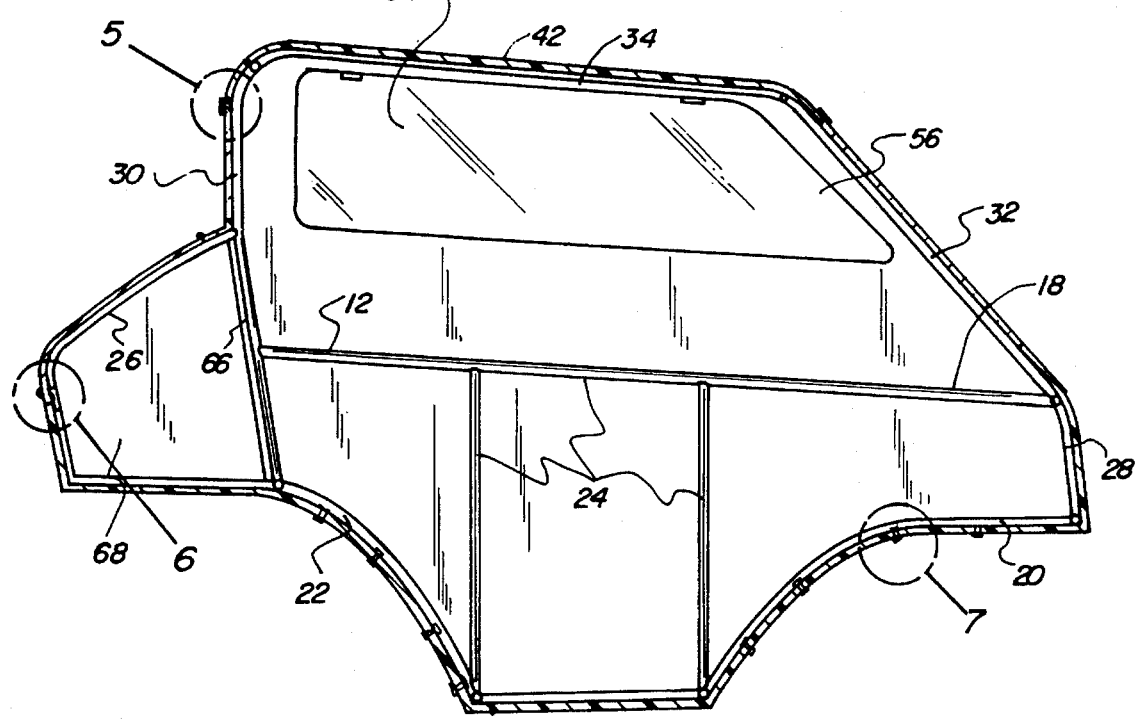

ALL-TERRAIN VEHICLE ENCLOSURE

BACKGROUND OF THE INVENTION

1. Field of the Invention

The present invention relates to an all-terrain vehicle enclosure and more particularly pertains to simultaneously shielding a driver and a driver's all-terrain vehicle from adverse weather conditions and terrain hazards with an all-terrain vehicle enclosure.

2. Description of the Prior Art

The use of vehicle enclosures is known in the prior art. More specifically, vehicle enclosures heretofore devised and utilized for the purpose of shielding a driver and the driver's vehicle from adverse weather conditions and terrain hazards are known to consist basically of familiar, expected and obvious structural configurations.

By way of example, U.S. Pat. No. D292,566 to Racicot discloses a canvas cabin for an all-terrain vehicle. U.S. Pat. No. 4,336,964 to Pivar discloses a lightweight canopy for a three-wheeled vehicle with a low center of gravity. U.S. Pat. No. 4,798,399 to Cameron discloses a combination safety cage for an all terrain vehicle. U.S. Pat. No. 4,950,017 to Norton discloses a kit which provides a removable top assembly for all-terrain vehicles and the like, and the assembled top thereof. U.S. Pat. No. 5,174,622 to Gutta discloses a combination roll cage and cover for all-terrain vehicles.

The aforementioned patents do not describe an all-terrain vehicle enclosure that is removably securable to an all-terrain vehicle and simultaneously protects a driver as well as the all-terrain vehicle from adverse weather conditions and terrain hazards.

In this respect, the all-terrain vehicle enclosure according to the present invention provides an apparatus primarily developed for the purpose of simultaneously shielding a driver and a driver's all-terrain vehicle from adverse weather conditions and terrain hazards.

SUMMARY OF THE INVENTION

The present invention provides an improved all-terrain vehicle enclosure. As such, the general purpose of the present invention, which will be described subsequently in greater detail, is to provide a new and improved all-terrain vehicle enclosure and method.

To attain this, the present invention essentially comprises, in combination, a rigid frame generally shaped in a contour of an automobile. The frame has a plurality of tubular and rigid members coupled together to define an open central portion for holding a driver and a top portion of the all-terrain vehicle therein. The frame has a peripheral skeletal portion. The frame has a curved front wheel well section, a curved rear wheel well section, and a pair of spaced, opposed, and parallel side sections extended between the front wheel well section and rear wheel well section. The frame has a trunk section that is extended upwards in curvature from the rear wheel well section, a hood section extended upwards from the front wheel well section, a rear viewing section extended upwards from the trunk section, a front viewing section extended upwards at an angle from the hood section, and a roof section extended between the front viewing section and rear viewing section. A rigid and segmented skin formed of an elastomeric matrix is included and secured over the skeletal portion of the frame to define a body. The body has a roof secured to the roof section and a front wall secured to the front viewing section and the hood section. The front wall has a front windshield aperture disposed therethrough at a location adjacent to the front viewing section. A rear wall is included and secured to the rear viewing section and the trunk section. The rear wall has a rear windshield aperture disposed therethrough at a location adjacent to the rear viewing section and a trunk aperture disposed therethrough at a location adjacent to the trunk section. A first side wall and a second side wall are included. Each is secured to a separate side section. The first side wall has a first window aperture disposed therethrough directly below the roof. The second side wall has a side door aperture disposed therethrough. A side door is included and pivotally coupled to the frame. The side door is positionable over the side door aperture. The side door has a second window aperture disposed therethrough at a location such that it is aligned with the first window aperture. A trunk door is included and pivotally coupled to the frame. The trunk door is positionable over the trunk aperture. An inner wall is included and secured to the trunk section at a location inwardly offset from the trunk aperture to define a rear cargo area for holding miscellaneous items therein. Side door latch means are included for securing the side door to the second side wall and over the side door aperture. Trunk latch means are included for securing the trunk door to the rear wall and over the trunk aperture. A first sheet, a second sheet, a third sheet, and a fourth sheet of transparent material formed of an elastomeric matrix are included. The first sheet is removably secured over the front windshield aperture to define a front windshield. The second sheet is removably secured over the rear windshield aperture to define a rear windshield. The third sheet is removably secured over the first window aperture to define a first side window. The fourth sheet is removably secured over the second window aperture to define a second side window. Frame coupling means are included for removably coupling the body over an all-terrain vehicle such that the wheels of the all-terrain vehicle extend from the body, thus allowing a driver to mount the all-terrain vehicle contained therein through the side door. Lastly, a coupling plate formed of steel is included. The coupling plate is positionable under the body and removably coupleable thereto. When the body is disposed over a top portion of the all-terrain vehicle and the coupling plate is secured thereto, the all-terrain vehicle and an associated driver are shielded from adverse weather conditions and terrain hazards.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Even still another object of the present invention is to provide a new and improved all-terrain vehicle enclosure for simultaneously shielding a driver and a driver's all-terrain vehicle from adverse weather conditions and terrain hazards.

Lastly, it is an object of the present invention to provide a new and improved all-terrain vehicle enclosure comprising a rigid frame having an open central portion for holding a driver and an all-terrain vehicle therein and a peripheral skeletal portion therearound; a rigid skin secured over the skeletal portion of the frame to define a body, the body further having at least one door aperture and at least one window aperture disposed thereon with the door aperture allowing a driver access therein; and frame coupling means for removably coupling the body over an all-terrain vehicle such that the wheels of the all-terrain vehicle extend from the body and a driver is allowed to mount an all-terrain vehicle contained therein through the door aperture.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear view of the present invention taken along the line 3—3 of FIG. 1.

FIG. 4 is a cross-sectional view of the present invention depicting the coupling between the frame and skin of the body taken along the line 4—4 of FIG. 3.

The same reference numerals refer to the same parts through the various Figures.

DESCRIPTION OF THE PREFERRED EMBODIMENT

Figure 1:
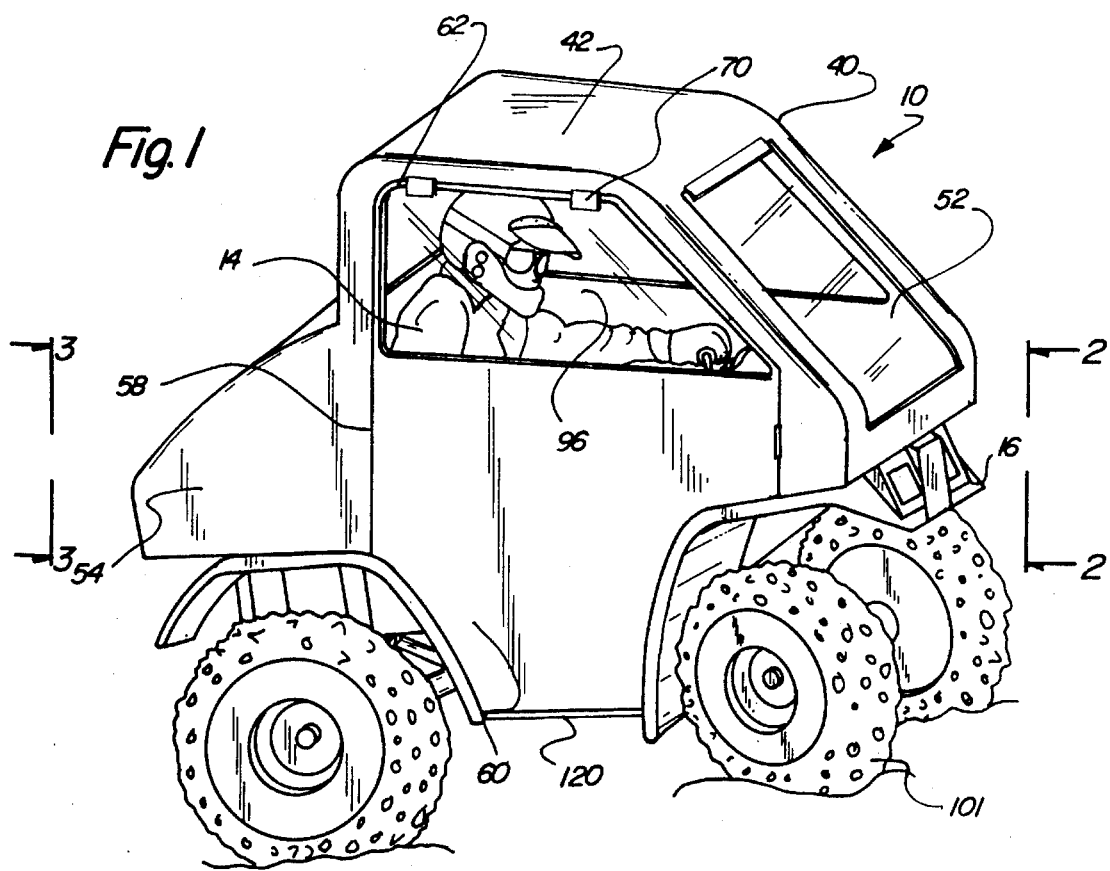
FIG. 1 is a perspective view of the preferred embodiment of the all-terrain vehicle enclosure constructed in accordance with the principles of the present invention.
Figure 2:
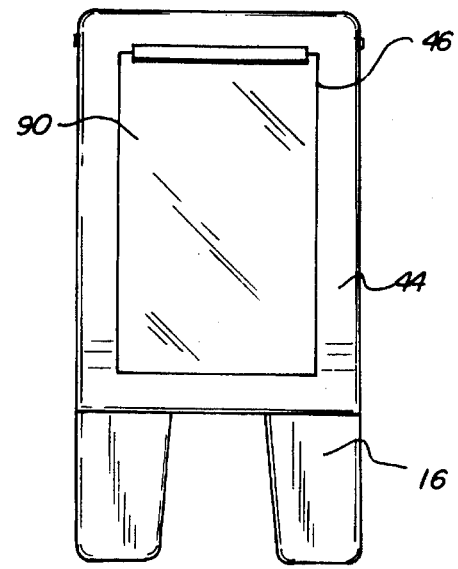
FIG. 2 is a front view of the present invention taken along the line 2—2 of FIG. 1.
Figure 5:
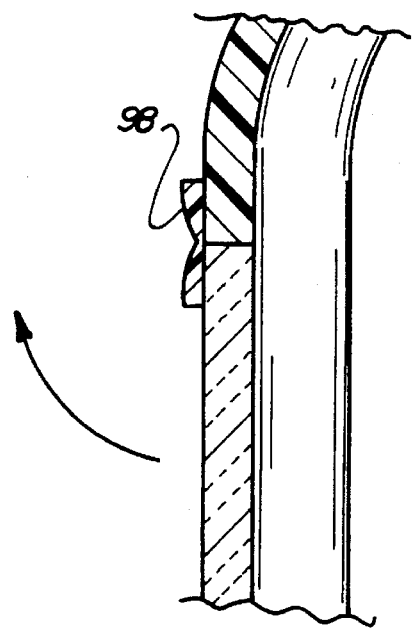
FIG. 5 is an enlarged cross-sectional view of the coupling between the frame, skin, and rear windshield of the present invention as shown in detail 5 of FIG. 4.
Figure 6:
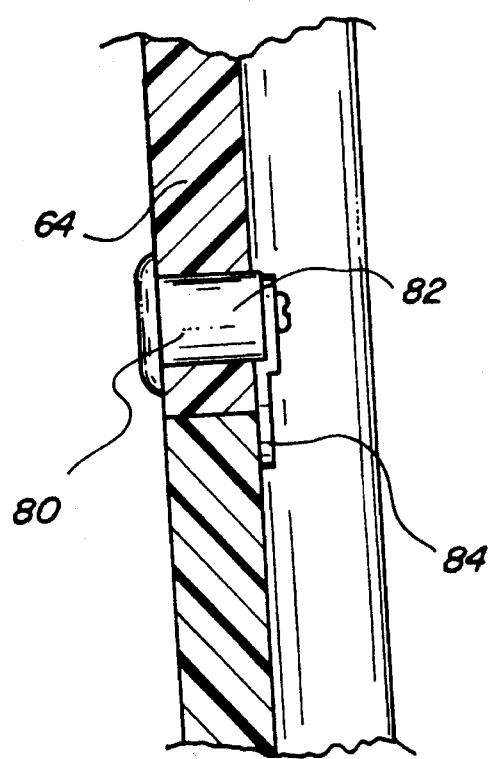
FIG. 6 is an enlarged cross-sectional view of the coupling between the frame, rear wall, trunk door, and trunk lock of the present invention as shown in detail 6 of FIG. 4.
Figure 7:
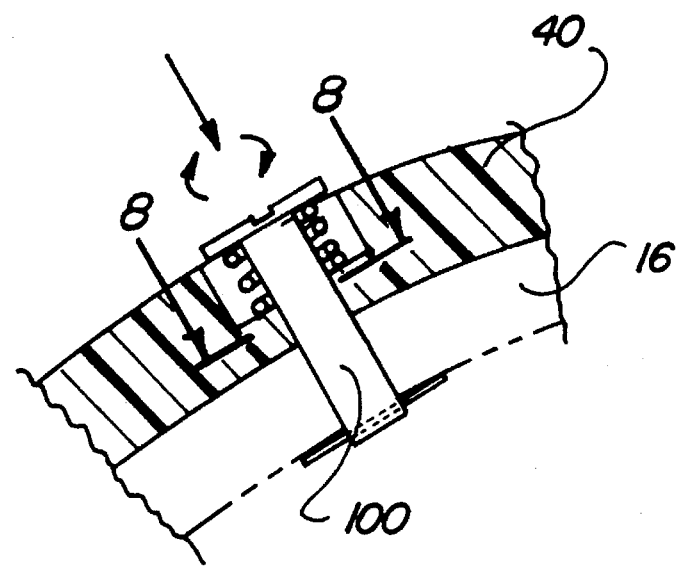
FIG. 7 is a cross-sectional view of the coupling of a side wall with a fender of an all-terrain vehicle as shown in detail 7 of FIG. 4.
Figure 8:
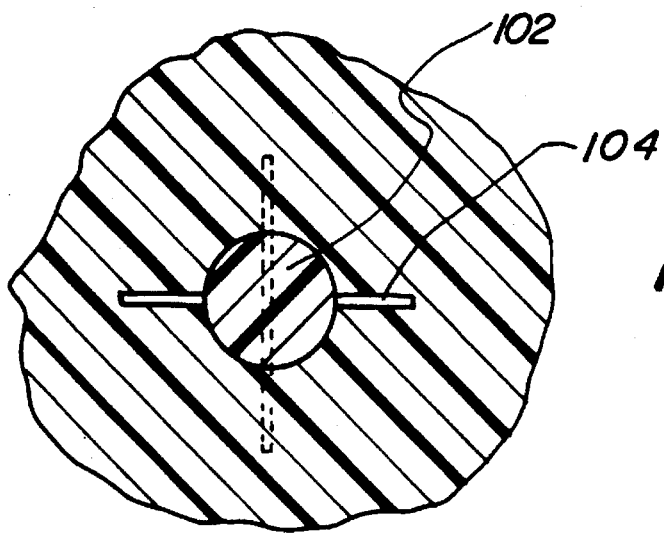
FIG. 8 is a cross-sectional view of the coupling of a side wall and a fender of an all-terrain vehicle taken along the line 8—8 of FIG. 7.

With reference now to the drawings, and in particular, to FIG. 1 thereof, the preferred embodiment of the new and improved all-terrain vehicle enclosure embodying the principles and concepts of the present invention and generally designated by the reference number 10 will be described.

Specifically, the present invention includes seven major components. The major components are the frame, body, side door latch means, trunk latch means, windshields and side windows, frame coupling means, and coupling plate. These components are interrelated to provide the intended function.

More specifically, it will be noted in the various Figures that the first major component is the frame 12. The frame is rigid in structure and generally shaped in the contour of an automobile. The frame is formed of a plurality of tubular and rigid members. These members may be formed of an elastomeric matrix or of metal. The members are coupled together to define an open central portion with an open bottom for holding a driver 14 and a top portion of an all-terrain vehicle 16 therein and a peripheral skeletal portion therearound. The peripheral skeletal portion has a curved front wheel well section 20, a curved rear wheel well section 22, and a pair of spaced, opposed, and parallel side sections 24 extended therebetween. The skeletal portion also has a trunk section 26 extended upwards in curvature from the rear wheel well section and a hood section 28 extended upwards from the front wheel well section. The skeletal portion also includes a rear viewing section 30 extended upwards from the trunk section and terminated in a generally curved portion, and a front viewing section 32 extended upwards at about a 45-degree angle from the hood section. The juncture between the hood section and front viewing section is generally curved in structure. The skeletal portion also includes a roof section 34 horizontally extended between the front viewing section and the rear viewing section.

The second major component is the body 40. The body consists of a rigid and segmented skin formed of an elastomeric matrix. This skin is secured over the skeletal portion of the frame in a plurality of sectionable elements. The sectionable elements include a roof, front wall, rear wall, side walls, side door, and trunk door. The roof 42 is secured to the roof section of the frame. The front wall 44 is secured to the front viewing section 32 and the hood section 28 of the frame. The front wall has an essentially rectangular front windshield aperture 46 disposed therethrough at a location adjacent to the front viewing section of the frame. The rear wall 48 is secured to the rear viewing section 30 and the trunk section 26 of the frame. The rear wall has an essentially rectangular rear windshield aperture 50 disposed therethrough at a location adjacent to the rear viewing section of the frame. The rear wall also includes an essentially rectangular trunk aperture 51 disposed therethrough at a location adjacent to the trunk section of the frame. A first side wall 52 and a second side wall 54 are each secured to a separate side section 24 of the frame. The first side wall has a polygonal first window aperture 56 disposed therethrough directly below the roof. The second side wall has a polygonal side door aperture 58 disposed therethrough extended from a location near the roof to the bottom of the body. A side door 60 is pivotally coupled to the frame at a location near the hood and positionable over the side door aperture. The side door may be opened and closed. The side door has a polygonal second window aperture 62 disposed therethrough at a location such that it is aligned with the first window aperture on the other side wall. The body includes a curved and essentially rectangular trunk door 64. The trunk door is pivotally coupled to the frame at a location near the rear windshield and positionable over the trunk aperture.

The trunk door may be opened and closed. The body also includes an inner wall 66. The inner wall is secured to the trunk section at a location inwardly offset from the trunk aperture and adjacent to the central portion of the frame. The inner wall in combination with the rear wall defines a rear cargo area 68 on the body for holding miscellaneous items therein.

The third major component is the side door latch means 70. The side door latch means is used for securing the side door 60 to the second side wall 54 over the side door aperture 58. In the preferred embodiment, the side door latch means consists of a pair of latches extended downwards from the second side wall at a location below the roof of the body. The side door latch means may also be formed with a hinge, a hook, or other similar mechanism. The side door latch means may also include a lock for securing the side door to the body.

The fourth major component is the trunk latch means 80. The trunk latch means is used for securing the trunk door 64 to the rear wall 48 over the trunk aperture 51. In the present invention the trunk latch means consists of a lock 82 for receiving a key and an arm 84 secured thereto with a bolt. By turning a key positionable in the lock in one direction or another, the arm releases or secures the trunk door to the body, respectively. The trunk latch means may also be formed with a hinge, a hook, or other similar mechanism.

The fifth major component is the windshields and windows. The windshields and windows are formed with a first sheet, second sheet, third sheet, and a fourth sheet of transparent material formed of a elastomeric matrix. The first sheet is removably secured over the front windshield aperture 46 to define a front windshield 90. The second sheet is removably secured over the rear windshield aperture 50 to define a rear windshield 92. The third sheet is removably secured over the first window aperture 56 to define a first side window 94. The fourth sheet is removably secured over the second window aperture 62 to define a second side window 96. Each window is removably secured over its respective aperture with a plurality of hinges 98 pivotally secured to the body near each aperture. The windows may be selectively removed for providing increased ventilation.

The sixth major component is the frame coupling means 100. The frame coupling means is used for removably coupling the body 40 over an all-terrain vehicle 16 such that the wheels 101 of the all-terrain vehicle extend from the bottom of the body. Furthermore, the frame coupling means couples the body to the all-terrain vehicle such that the driver is allowed to mount the all-terrain vehicle contained therein through the side door 60. In the present invention, a plurality of spring-loaded locking pins 102 are disposed through the body and through slots on each fender of an all-terrain vehicle. Besides coupling the body with the all-terrain vehicle, spring-loaded pin helps to damp vibrational motion directed from the fenders of the all-terrain vehicle towards the body. A tongue 104 is extended through each locking pin for securably coupling the body to the fender of the all-terrain vehicle. The locking pin is coupled with the body, and the tongue thereof is disposed through a separate slot on a fender. Rotating the locking pin approximately 90 degrees secures the locking pin with the fender and the body. The locking pin may then be removed from the fender by rotating it approximately 90 degrees and then pulling it out of its respective slot.

The seventh major component is the coupling plate 120. The coupling plate is formed of steel. It is positionable over the open bottom of the body and removably coupled thereto. When the body is disposed over the top portion of an all-terrain vehicle, and the coupling plate is secured over the open bottom of the body, the all-terrain vehicle and an associated driver are shielded from adverse weather conditions and terrain hazards. The coupling plate helps protect the undercarriage of the all-terrain vehicle. Furthermore, it prevents mud and other such debris from splashing up upon a driver.

The present invention is an enclosure for a four-wheel, all-terrain vehicle used in exploring the outdoors. The present invention may also be utilized with three-wheel all-terrain vehicles. All-terrain vehicles are open to the elements so that no protection is offered from inclement weather conditions or the hazards one may encounter while driving through woods or brush.

The frame of the present invention is made from ½" diameter conduit pipe with its bottom portion designed to fit over the contour of the vehicle's body. On the front of the vehicle, the frame sits just above the headlights, then it slopes back at approximately a 45-angle forming the windshield area. It extends horizontally over the passenger portion of the vehicle to the rear wheels, then drops vertically a short distance. It slopes down again at a 45-angle, and then down to form a cargo storage section. The entire frame is covered with ⅛" thick plastic sheet. The coupling plate serves as a floor and is made of 1/16" steel mounted under the frame to protect the engine from damage from rocks, sticks and stumps when off the road. The floor cuts off the flow of air from under the body of present invention, thereby decreasing drag and improving fuel economy.

All sides of the present invention have areas of clear plastic that the driver can see through to assure safe driving. Also, the front, back, and sides can be opened for ventilation for warm weather driving. Temporary fasteners enable easy installation and removal of the windows of the present invention. The present invention allows the use of an all-terrain vehicle in almost all types of weather and terrain. Hunters, farmers, recreational drivers, and others who use an all-terrain vehicle should appreciate the protection the present invention provides. The present invention can be removed from an all-terrain vehicle in approximately 8 minutes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and the manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes thereto will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is:

1. An all-terrain vehicle enclosure for simultaneously shielding a driver and a driver's all-terrain vehicle from adverse weather conditions and terrain hazards comprising, in combination:

a rigid frame generally shaped in a contour of an automobile formed of a plurality of tubular and rigid members coupled together to define an open central portion for holding the driver and a top portion of the all-terrain vehicle therein and a peripheral skeletal portion therearound having a curved front wheel well section, a curved rear wheel well section, a pair of spaced, opposed, and parallel side sections extended between the front wheel well section and the rear wheel well section, a trunk section extended upwards in curvature from the rear wheel well section, a hood section extended upwards from the front wheel well section, a rear viewing section extended upwards from the trunk section, a front viewing section extended upwards at an angle from the hood section, and a roof section extended between the front viewing section and the rear viewing section;

a rigid and segmented skin formed of an elastomeric matrix secured over the skeletal portion of the frame to define a body, the body having a roof secured to the roof section, a front wall secured to the front viewing section and the hood section with the front wall having a front windshield aperture disposed therethrough at a location adjacent to the front viewing section, a rear wall secured to the rear viewing section and the trunk section with the rear wall having a rear windshield aperture disposed therethrough at a location adjacent to the rear viewing section and a trunk aperture disposed therethrough at a location adjacent to the trunk section, a first side wall and a second side wall each secured to one of the separate side sections with the first side wall having a first window aperture disposed therethrough directly below the roof and the second side wall having a side door aperture disposed therethrough, a side door pivotally coupled to the frame and positionable over the side door aperture with the side door having a second window aperture disposed therethrough at a location such that it is aligned with the first window aperture, a trunk door pivotally coupled to the frame and positionable over the trunk aperture, and an inner wall secured to the trunk section at a location inwardly offset from the trunk aperture to define a rear cargo area for holding miscellaneous items therein;

side door latch means for securing the side door to the second side wall and over the side door aperture;

trunk latch means for securing the trunk door to the rear wall and over the trunk aperture;

a first sheet, a second sheet, a third sheet, and a fourth sheet of transparent material formed of an elastomeric matrix with the first sheet removably secured over the front windshield aperture to define a front windshield, the second sheet removably secured over the rear windshield aperture to define a rear windshield, the third sheet removably secured over the first window aperture to define a first side window, and the fourth sheet removably secured over the second window aperture to define a second side window;

frame coupling means for removably coupling the body over the all-terrain vehicle such that wheels of the all-terrain vehicle extend from the body and the driver is allowed to mount the all-terrain vehicle contained therein through the side door; and a coupling plate formed of steel positionable under the body and removably coupleable thereto, whereby when the body is disposed over the top portion of the all-terrain vehicle and the coupling plate is secured thereto, the all-terrain vehicle and the associated driver are shielded from adverse weather conditions and terrain hazards.

* * * * *